(12) United States Patent
Krafcik et al.

(10) Patent No.: US 11,720,710 B2
(45) Date of Patent: Aug. 8, 2023

(54) AUTOMATICALLY DETECTING UNAUTHORIZED RE-IDENTIFICATION

(71) Applicant: Google LLC, Mountain View, CA (US)

(72) Inventors: Jonathan Krafcik, Mercer Island, WA (US); Gang Wang, Jersey City, NJ (US); Yibo Chen, Cupertino, CA (US)

(73) Assignee: Google LLC, Mountain View, CA (US)

( * ) Notice: Subject to any disclaimer, the term of this patent is extended or adjusted under 35 U.S.C. 154(b) by 129 days.

(21) Appl. No.: 17/375,665

(22) Filed: Jul. 14, 2021

(65) Prior Publication Data

US 2021/0342482 A1 Nov. 4, 2021

Related U.S. Application Data

(63) Continuation of application No. 16/412,027, filed on May 14, 2019, now Pat. No. 11,093,644.

(51) Int. Cl.
*G06F 21/62* (2013.01)
*G06N 20/00* (2019.01)
*G06N 5/04* (2023.01)

(52) U.S. Cl.
CPC ...... *G06F 21/6254* (2013.01); *G06F 21/6263* (2013.01); *G06N 5/04* (2013.01); *G06N 20/00* (2019.01)

(58) Field of Classification Search
CPC ... G06F 21/6254; G06F 21/6263; G06N 5/04; G06N 20/00; G06Q 30/0615;
(Continued)

(56) References Cited

U.S. PATENT DOCUMENTS 10,115,124 B1 10/2018 Kamvysselis
2009/0150539 A1 6/2009 Epling
(Continued)

FOREIGN PATENT DOCUMENTS

CA 2986320 A1 * 5/2019 ........... G06F 16/383
CN 101189608 5/2008
(Continued)

OTHER PUBLICATIONS

International Search Report and Written Opinion for PCT Appln. Ser. No. PCT/US2020/032470 dated Aug. 14, 2020 (16 pages).
(Continued)

*Primary Examiner* — Jacob Lipman
(74) *Attorney, Agent, or Firm* — Fish & Richardson P.C.

(57) ABSTRACT

The present disclosure provides systems and methods for automatically detecting third-party re-identification of anonymized computing devices. The method includes retrieving a log of content items provided to anonymized computing devices identifying a first content item provided to a plurality of anonymized computing devices within a first predetermined time period; for each anonymized computing device of the plurality of anonymized computing devices, generating a set of identifications of second content items retrieved by the anonymized computing device prior to receiving the first content item within a second predetermined time period; determining that signals or combinations of signals with a highest predictive ability between a first set of identifications and a second set of identifications exceeds a threshold; identifying a provider of the first content item; and if the signals or combinations of signals with the highest predictive ability exceeds the threshold, preventing, transmission of a request of an anonymized computing device for a content item to the identified provider.

20 Claims, 5 Drawing Sheets

(58) Field of Classification Search
CPC ... G06Q 50/265; H04L 63/1408; H04L 67/53; H04L 2463/102; H04L 67/02; H04L 67/535; H04L 63/0407; H04W 12/02
USPC .......................................................... 726/29
See application file for complete search history.

(56) References Cited

U.S. PATENT DOCUMENTS

| | | | |
|---|---|---|---|
| 2017/0142158 | A1 | 5/2017 | Lautaris et al. |
| 2019/0188292 | A1* | 6/2019 | Gkoulalas-Divanis ..................... G06N 5/025 |
| 2019/0205507 | A1* | 7/2019 | Antonatos ........... H04L 63/1491 |

FOREIGN PATENT DOCUMENTS

| | | |
|---|---|---|
| CN | 103118024 | 5/2013 |
| CN | 104036030 | 9/2014 |
| CN | 107864117 | 3/2018 |
| CN | 108171074 | 6/2018 |

OTHER PUBLICATIONS

Wikipedia.org [online], "Ad Blocking," Apr. 2017, retrieved on Aug. 10, 2021, retrieved from URL<https://en.wikipedia.org/wiki/Ad_blocking>, 16 pages.

Wikipedia.org [online], "Binary classification," Oct. 2017, retrieved on Aug. 10, 2021, 2021. retrieved from URL<https://en.wikipedia.org/wiki/Binary_classification>, 4 pages.

Wikipedia.org [online], "Digital image processing," May 2020, retrieved on Aug. 10, 2021, retrieved from URL<https://en.wikipedia.org/wiki/Digital_image processing>, 14 pages.

Wikipedia.org [online], "Natural language processing," Feb. 2021, retrieved on Aug. 10, 2021, retrieved from URL<https://en.wikipedia.org/wiki/Natural_language_processing>, 12 pages.

Wikipedia.org [online], "Optical character recognition," Jan. 2020, retrieved on Aug. 10, 2021, retrieved from URL<https://en.wikipedia.org/wiki/Optical_character_recognition>, 11 pages.

Wikipedia.org [online], "Pointwise mutual information," May 2015, retrieved on Aug. 10, 2021, retrieved from URL<https://en.wikipedia.org/wiki/Pointwise_mutual_information>, 5 pages.

Yamada et al., "Web Tracking Site Detection Based on Temporal Link Analysis," IEEE 24th International Conference on Advanced Information Networking and Applications Workshops, Apr. 20, 2010, pp. 626-631 (6 pages).

Office Action in Chinese Appln No. 202080008803.5, dated Feb. 9, 2022, 23 pages (with English translation).

Office Action in Indian Appln. No. 202127028177, dated Mar. 15, 2022, 6 pages (with English translation).

Notice of Allowance in Chinese Appln. No. 202080008803.5, dated Sep. 13, 2022, 4 pages (with English translation).

* cited by examiner

AUTOMATICALLY DETECTING UNAUTHORIZED RE-IDENTIFICATION

CROSS-REFERENCE TO RELATED APPLICATIONS

This application claims the benefit of priority as a continuation of U.S. Non-Provisional patent application Ser. No. 16/412,027, entitled "Automatically Detecting Unauthorized Re-Identification," filed May 14, 2019, the entirety of which is incorporated by reference herein.

BACKGROUND

Today, it is common for people to shop online for goods instead of going to brick and mortar stores. While people are visiting different web pages and domains to shop, information about the people is often tracked by third parties using cookies. Cookies enable third parties to track what web pages a person visits, how often the person visits each web page, how long the person stays on each web page before viewing a new web page, any selections the person makes on each web page, the content of each web page, any data entries the person performs at each web page, etc. The third parties are often content providers that use the data gathered from cookies to select user targeted content to users based on data gathered through the cookies for each user. The user targeted content can appear to a user when the user views a web page that may be unrelated to the content being displayed to the user.

To stop unwanted tracking, and consequently user targeted content selecting by third party content providers, websites and web browsers often present an option to users asking the users if the user wants to enable or disable cookies. Unfortunately, even if a user selects an option to disable cookies, third party content providers can ignore the user's selection and use cookies anyway or circumvent the user's selection to disable cookies using re-identification techniques (e.g., deterministic or probabilistic approaches, email-based identity synchronization, phone-based identity synchronization, server-to-server synchronization, remote procedure calls, etc.). These re-identification techniques allow third party content providers to track the activities of users after the users selected the option to disable cookies and consequently think they are not being tracked or receiving user targeted content.

It can be difficult for a computer system or web browser to determine if users are being tracked by third party content providers after the users have selected an option to disable cookies. The same content can be requested by computer devices and presented to users regardless of if the users are being tracked. For example, a user can open a browser and select an option to disable cookies. The user can visit a web page discussing cars and then visit another web page where content describing a car appears in a side ribbon of the website. The same content can be presented as a result of tracking the user from the website about the car or may be randomly selected and presented. Previous systems and methods do not have a way of determining how the content was selected (e.g. targeted or randomly selected) to identify if the content provider is tracking users despite the user selecting an option to disable cookies. While web browsers can currently block third party content providers that track users even after an option to not be tracked has been selected, previous systems and methods cannot identify content providers that are doing so.

SUMMARY

The systems and methods discussed herein provide a machine learning model (e.g., a neural network, a support vector machine, random forest, etc.) that can automatically determine a probability that a content provider is tracking users despite the users selecting an option that would otherwise stop them from being tracked. The inputs to the neural network can be common characteristics that a piece of content shown to a user on a web page has with other web pages, domains, and keywords that users have previously viewed or input into a browser. Other inputs can be common web pages, domains, and keywords between users that have viewed or provided an input at different computers before receiving a same piece of content. Each of these inputs can be associated with different weights in the neural network to determine a binary classification representing a probability that a specific content provider is tracking online activity of web users. The weights can be finely tuned to improve performance of the neural network to accurately determine a probability that content providers are tracking users as the neural network receives more inputs and produces outputs. A system can obtain the probability that a content provider is tracking users determined by the neural network and determine if the probability is above an administrator selected threshold. If the probability is above the threshold, the system can prevent the content provider from providing content to users. Any requests for content from computer devices sent to the content providers determined to be tracking users can be redirected to other content providers.

Advantageously, by implementing the systems and methods discussed herein, a system can automatically identify third party content providers that are tracking web browser users after the users have selected an option to prevent the providers from doing so. Systems not utilizing the systems and methods discussed herein may rely on proxies, VPNs, user agent scrubs, fingerprint identifications (e.g., unique identifications in URL parameters), email matching and reducing, phone number matching and reducing, etc., to identify and prevent content providers from tracking users. Each of these techniques can be used depending on how third parties are tracking the users, but they are not effective against all tracking techniques. Further, it is not always feasible to implement these identification and prevention techniques because they can be difficult to scale, too expensive, or difficult to implement.

Fortunately, the systems and methods described herein can be used to accurately and automatically determine if third parties are tracking users regardless of how the third parties are performing the tracking and then prevent the third parties from providing any more content to web browsers. A system can do so based on characteristics of content provided by content providers and characteristics of content previously viewed by users. Using a neural network with a binary classification output, the system can differentiate between content that is randomly selected and presented to users and content that is a product of targeted tracking, even if content is displayed to a user after the user visits a website containing similar characteristics to the displayed content. Consequently, third party content providers will not have a need to invade the privacy of people by tracking their web browser activities as they will be prevented from providing content to web users after being identified for tracking users that wish to keep their web browser activity hidden.

In an aspect described herein, a method is provided for detecting third-party re-identification of anonymized computing devices. The method comprises retrieving, by an analyzer of a computing system, a log of content items provided to anonymized computing devices; identifying, by the analyzer, a first content item provided to a plurality of anonymized computing devices within a first predetermined time period; for each anonymized computing device of the plurality of anonymized computing devices, generating, by the analyzer, a set of identifications of second content items signal or a combination of signals with a highest predictive ability between a first set of identifications and a second set of identifications exceeds a threshold; identifying, by the analyzer, a provider of the first content item; and responsive to the determination that the signal or combination of signals with the highest predictive ability between the first set of identifications and the second set of identifications exceeds the threshold, preventing, by the computing system, transmission of a request of an anonymized computing device for a content item to the identified provider.

In some implementations, the identifications of the second content items comprise identifications of web pages visited by each anonymized computing device. In some implementations, the identifications of the second content items comprise identifications of domains visited by each anonymized computing device. In some implementations, the identifications of the second content items comprise identifications of keywords associated with domains visited by each anonymized computing device. In some implementations, the method further comprises determining, by the analyzer, that a size of the signal or combination of signals with the highest predictive ability between the first set of identifications and the second set of identifications exceeds sizes of signals or combinations of signals with the highest predictive ability between each other pair of sets of identifications. In some implementations, the method further comprises determining, by the analyzer, that the signal or combination of signals with the highest predictive ability between the first set of identifications and the second set of identifications is common to a third set of identifications. In some implementations, preventing transmission of the request further comprises receiving, by the computing system, the request for the content item from the anonymized computing device; and redirecting, by the computing system, the request to a second provider.

In some implementations, preventing transmission of the request is further responsive to identifying, by the analyzer, a third content item provided by the identified provider to the plurality of anonymized computing devices within the first predetermined time period; for each anonymized computing device of the plurality of anonymized computing devices, generating, by the analyzer, a set of identifications of fourth content items retrieved by the anonymized computing device prior to receiving the third content item within the second predetermined time period; and determining, by the analyzer, that a signal or combination of signals with the highest predictive ability between a first set of identifications of fourth content items and a second set of identifications of fourth content items exceeds the threshold.

In some implementations, the method further comprises incrementing a counter associated with the identified provider, responsive to the determination that the signal or combination of signals with the highest predictive ability between the first set of identifications and the second set of identifications exceeds the threshold. In some implementations, preventing transmission of the request is further responsive to the counter associated with the identified provider exceeding a second threshold.

In another aspect, a system for detecting third-party re-identification of anonymized computing devices is described. The system comprises a computing system comprising a processor, a memory device, and a network interface, the processor executing an analyzer. The analyzer is configured to retrieve from the memory device a log of content items provided to anonymized computing devices, identify a first content item provided to a plurality of anonymized computing devices within a first predetermined time period, for each anonymized computing device of the plurality of anonymized computing devices, generate a set of identifications of second content items retrieved by the anonymized computing device prior to receiving the first content item within a second predetermined time period, determine that a signal or combination of signals with a highest predictive ability between a first set of identifications and a second set of identifications exceeds a threshold, and identify a provider of the first content item; and wherein the network interface is configured to prevent, responsive to the determination that the signal or combination of signals with the highest predictive ability between the first set of identifications and the second set of identifications exceeds the threshold, transmission of a request of an anonymized computing device for a content item to the identified provider.

In some implementations, the identifications of the second content items comprise identifications of web pages visited by each anonymized computing device. In some implementations, the identifications of the second content items comprise identifications of domains visited by each anonymized computing device. In some implementations, the identifications of the second content items comprise identifications of keywords associated with domains visited by each anonymized computing device. In some implementations, the analyzer is further configured to determine that a size of the signal or combination of signals with the highest predictive ability between the first set of identifications and the second set of identifications exceeds sizes of signals or combinations of signals with the highest predictive ability between each other pair of sets of identifications.

In some implementations, the analyzer is further configured to determine that the signal or combination of signals with the highest predictive ability between the first set of identifications and the second set of identifications is common to a third set of identifications. In some implementations, the network interface is further configured to receive the request for the content item from the anonymized computing device; and redirect the request to a second provider.

In some implementations, the analyzer is further configured to identify a third content item provided by the identified provider to the plurality of anonymized computing devices within the first predetermined time period; for each anonymized computing device of the plurality of anonymized computing devices, generate a set of identifications of fourth content items retrieved by the anonymized computing device prior to receiving the third content item within the second predetermined time period; and determine that a signal or a combination of signals with the highest predictive ability between a first set of identifications of fourth content items and a second set of identifications of fourth content items exceeds the threshold.

In some implementations, the analyzer is further configured to increment a counter associated with the identified provider, responsive to the determination that the signal or combination of signals with the highest predictive ability between the first set of identifications and the second set of identifications exceeds the threshold. In some implementations, the network interface is further configured to prevent transmission of the request responsive to the counter associated with the identified provider exceeding a second threshold.

Optional features of one aspect may be combined with any other aspect.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

It can be difficult for a computer system or web browser to determine if users are being tracked by third party content providers after the users have selected an option to disable cookies in browsers, or enable LAT on mobile devices. For example, a user can open a browser and select an option to disable cookies. The user can visit a web page discussing cars and then visit another web page that has nothing to do with cars where content for a car appears. The same content can be presented as a result of tracking the user from the website about the car or be randomly selected or contextually selected by a server and presented. Previous systems and methods do not have a way of determining how the content was selected (e.g. targeted or randomly selected or contextually selected) to identify if the content provider is tracking users despite the user selecting an option to disable cookies. While web browsers can currently block content providers that track users even after an option to not be tracked has been selected, previous systems and methods cannot identify content providers that are doing so. Thus, a method of automatically identifying and preventing content providers from tracking users against their wishes is needed.

Figure 1A:
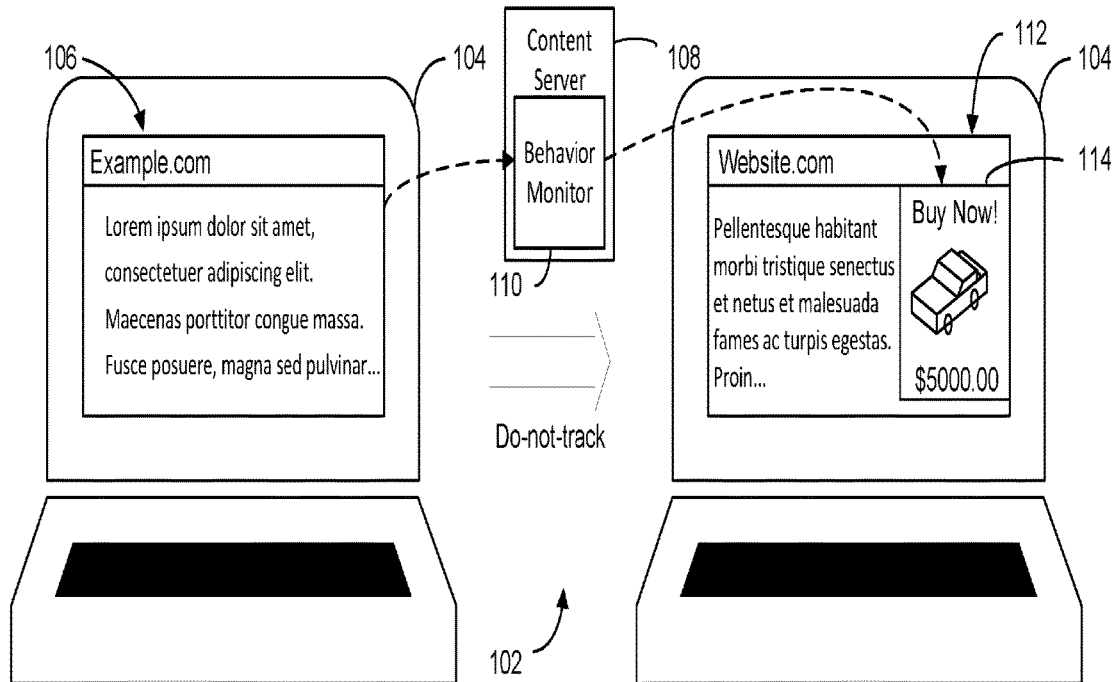
FIG. 1A is a block diagram of two sequences, each sequence including a user viewing a first web page and a second web page and being provided with content at the second web page, according to some implementations.

For example, referring first to FIG. 1A, illustrated is a block diagram of two sequences 102 and 116, each sequence 102 and 116 including a device retrieving and displaying a first web page and then retrieving and displaying a second web page and being provided with content at the second web page, in some implementations. Sequence 102 may be a sequence of a first user device 104 retrieving and displaying website 106 and then retrieving and displaying another website 112, in some implementations. A content server 108 can monitor the different web pages that the device accesses. Sequence 116 may be a sequence of another device 118 retrieving and displaying a website 120 and then retrieving and displaying another website 126, in some implementations. A content server 122 can provide random or contextually targeted content to user device 118.

At sequence 102, user device 104 retrieves and displays a website 106, in some implementations. The website can be related to shopping for different sports, hobbies, or pets, or any other such content, or may be non-shopping related. The website can also have characteristics related to content of the website that are stored as cookies on user devices as small files or files by the website. The cookies are often first-party cookies that are generated and stored by the domain of the web site being accessed, but the cookies can also be third-party cookies, which are cookies stored by domains different from the domain the device is accessing. Third-party cookies are often stored in user devices by content providers to track web activities being performed on a particular user device. The content providers can use the cookies to select and present user targeted content to a device based on the tracked web activities of the device or a user associated with the device. In sequence 102, third-party cookies can be stored on user device 104 to track that the device accessed a website 106 discussing, for example, cars. In some implementations, upon opening a website or a web browser, a user of the device may be presented with an option to enable or disable cookies. The option can be directed towards third party and/or first party cookies. If the user selects the option to disable cookies, that could mean the user does not wish to be tracked and wants to retain their privacy.

Content server 108 may be a server or processor configured to provide content to users at dedicated content spaces of a website after receiving a request form a user device. Content server 108 may include a behavior monitor 110. Behavior monitor 110 may comprise an application, server, service, daemon, routine, or other executable logic to monitor the web browsing and/or searching behavior of users at different user devices, in some implementations. In some implementations, behavior monitor 110 can monitor the behavior of users through deterministic or probabilistic methods, email-based identity synchronization, phone-based identity synchronization, server-to-server synchronization, remote procedure call applications, IP address monitoring, etc. In some implementations, behavior monitor 110 can monitor behavior of users when the users are using a privacy-protecting browser such as Incognito mode of Google Chrome, e.g. based on tracking requests from the device's IP address or similar data, despite the device not retaining cookies. Behavior monitor 110 can track the web browsing behavior of users through methods other than third party cookies, which users often actively disable through a disable selection or may be automatically disabled by a web browser unless the user chooses an option to enable third party cookies.

Behavior monitor 110 can identify that the user viewed the website 106, e.g., example.com, and identify the content of the website (for example, by retrieving a copy of the website, identifying keywords associated with the website or domain, etc.). Consequently, behavior monitor 110 can provide content related to example.com at another website 112, such as website.com. For example, if example.com is related to cars, behavior monitor can determine that example.com is related to cars and provide additional content related to cars when the user views another website, such as website.com. Additional content 114 may be an example of content provided by a content provider responsive to identifying that a user viewed a related website through behavior monitor 110 and provided at another website as a result of the identification.

Sequence 116 may be similar to sequence 102 but additional content is instead selected and provided to a user randomly or via contextual targeting instead of as a result of any behavior monitoring. In sequence 116, device 118 may retrieve and display a website 120, e.g., example.com, via user device 118. A user of the device may have selected to not allow third party cookies. The device may subsequently retrieve and display another website 126, e.g., website.com. Additional content 128 can be provided at website.com by a content server 122, and may be randomly selected or contextually selected rather than selected via tracking past browsing or search behavior.

Content server 122 can be a server or processor configured to provide additional content from content providers to websites and/or user devices upon receiving a request from the user devices. Content server 122 can be similar to or the same as content server 108. Content server 122 is shown to include contextual selector 124. Contextual selector 124 may comprise an application, server, service, daemon, routine, or other executable logic for contextually selecting additional content to be provided to a device accessing a website or other primary content, in some implementations. In some implementations, contextual selector 124 can select content using random number generation or pseudo-random number generation techniques. In some implementations, contextual selector 124 can select content based on the context of web pages the content will be provided on. In the shown example, content server 122 can provide the same content related to cars as was provided by content server 108 of sequence 102. Content server 122 provides the content related to cars after the user visited the same website as the user of sequence 102, whose web activity was tracked by content server 108.

As can be seen in sequences 102 and 116, a user can visit the same websites and be presented with the same content, while viewing another website, regardless of whether they are being tracked. Sequence 102 includes a third party tracking a user despite the user choosing an option to disable third party cookies and not be tracked. The third party selects and provides content based on the tracking. At sequence 116, the user visits the same web pages before receiving the same content from a content provider as in sequence 102, but at sequence 116, the content was contextually selected and provided instead of selected as a result of any tracking. Consequently, it may be difficult for users and systems lacking the implementations discussed herein to identify when third parties are tracking users based on the content that is shown to them. Users choose the option to disable third party cookies so third parties cannot track their web activity and maintain their privacy. To users and web browsers, it is difficult to determine when they are being tracked based solely on the content that is provided. Thus, there is a need to automatically determine when users are being tracked so processors relaying content for content providers can stop third parties from tracking users and protect the privacy of users.

Fortunately, the systems and methods described herein can be used to accurately and automatically determine if third parties are tracking users regardless of how the third parties are performing the tracking and then prevent the third parties from providing any more content to user devices. A system can do so based on characteristics of content provided by content providers and characteristics of content previously viewed by users. Using a neural network with a binary classification output, the system can differentiate between content that is contextually selected and presented to users and content that is a product of targeted tracking, even if content is displayed to a user after the user visits a website containing similar characteristics to the displayed content. Consequently, third party content providers may be prevented from providing content to web users after being identified to be tracking users that wish to keep their web browser activity hidden, increasing user privacy.

Figure 1A:
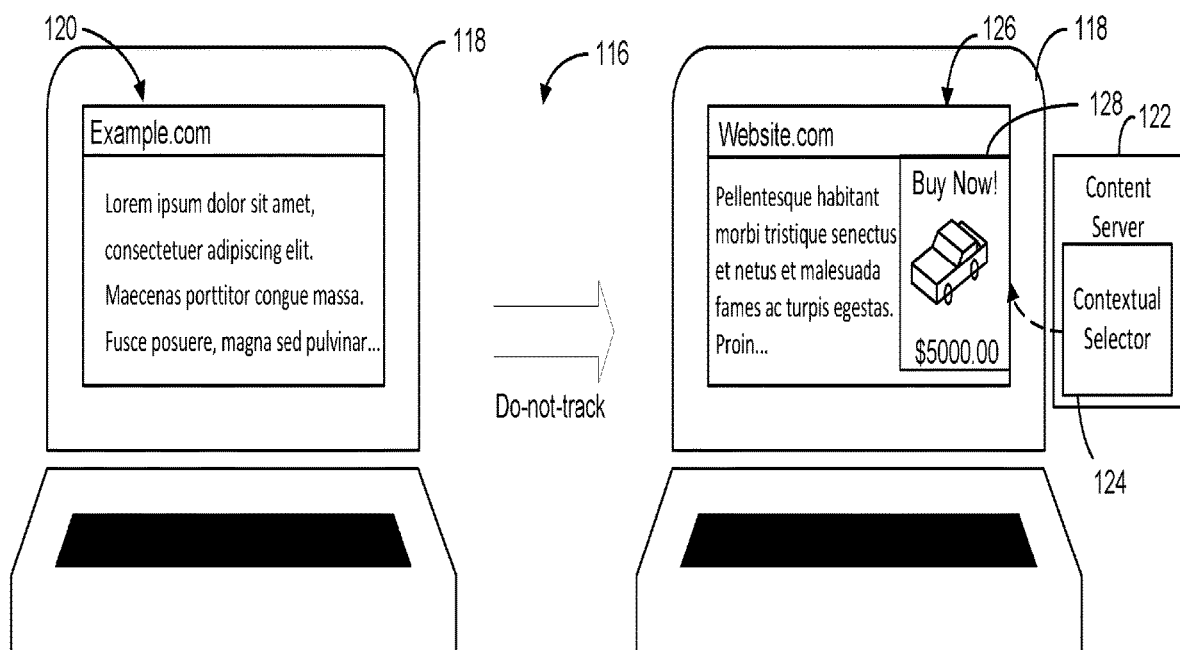
Figure 1B:
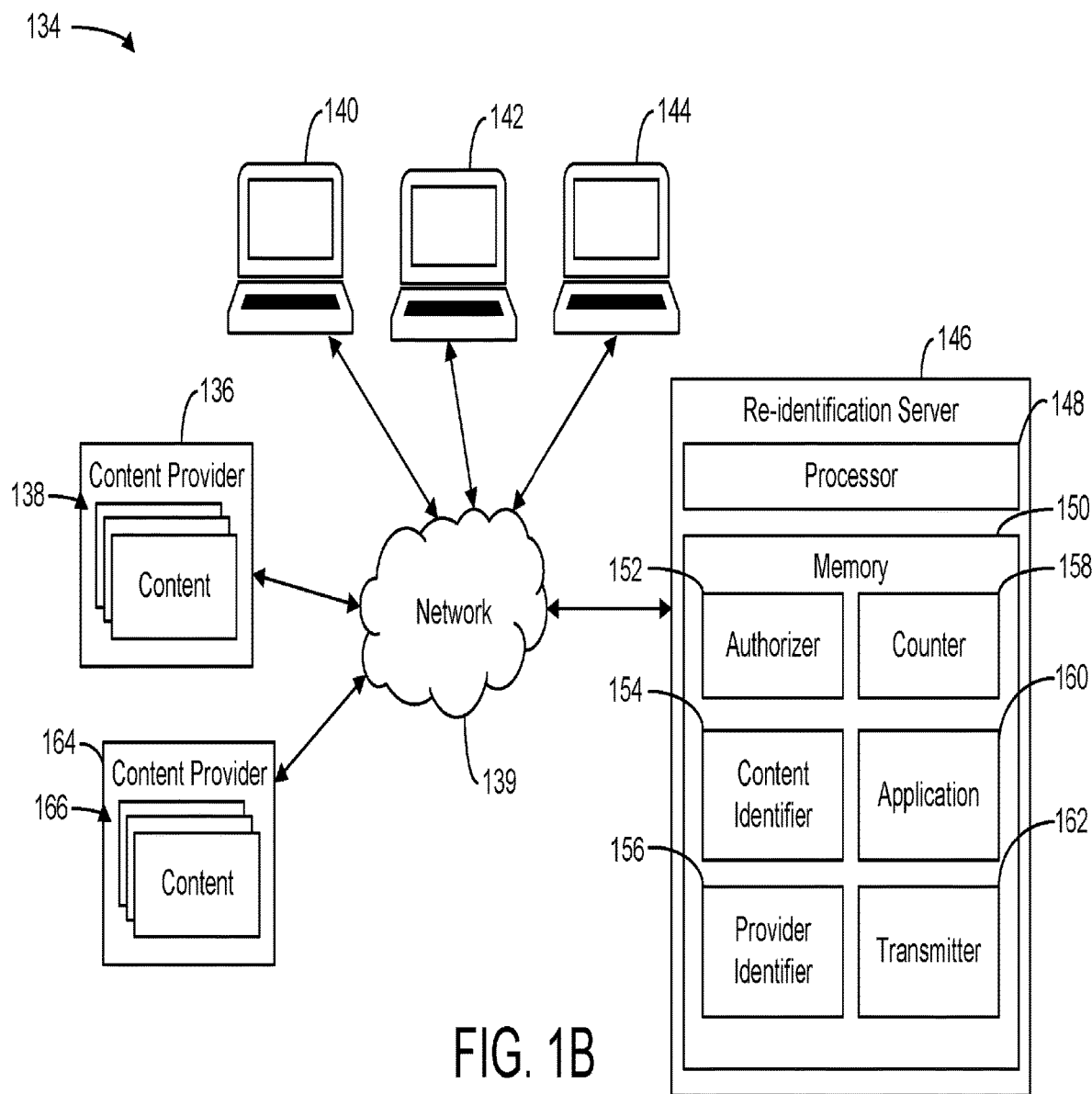
FIG. 1B is a block diagram of an implementation of a system for determining if a third-party is tracking activity of multiple users, according to some implementations.

For example, referring to FIG. 1B, an implementation of a system 134 for determining if a third-party is tracking activity of multiple users is shown, according to some implementations. System 134 is shown to include content providers 136 and 164, user devices 140, 142, and 144, and re-identification server 146, in some implementations. Each of content providers 136 and 164, user devices 140, 142, and 144, and a re-identification server 146 can communicate with each other and to other devices through a network 139. Network 139 can include synchronous or asynchronous networks. Content providers 136 and 164 can provide content to user devices 140, 142, and 144 after receiving a request from one of the user devices. Upon providing the content, re-identification server 146, using instructions stored in re-identification server 146, can determine if either content provider 136 or 164 is tracking web activity of a user at user devices 140, 142, and 144. Re-identification server 146 can do so using a neural network (or any other machine learning model) that automatically determines a probability that the content providers 136 or 164 are tracking the users. Re-identification server 146 can determine if the probability is above a predetermined threshold and, if the probability is above the threshold, prevent content providers 136 or 164 from providing content to user devices 140, 142, and 144 by redirecting requests for content to other content providers or by blocking any content provided by content providers 136 or 164 from being transmitted to user devices 140, 142, and 144.

User devices 140, 142, and 144, referred to generally as user device(s), may comprise any type and form of media device or computing device, including a desktop computer, laptop computer, portable computer, tablet computer, wearable computer, embedded computer, smart television, set top box, console, Internet of Things (IoT) device or smart appliance, or any other type and form of computing device. Client device(s) may be referred to variously as a client, device, client device, computing device, user device, anonymized computing device or any other such term. Client devices and intermediary modulator may receive media streams via any appropriate network, including local area networks (LANs), wide area networks (WANs) such as the Internet, satellite networks, cable networks, broadband networks, fiber optic networks, microwave networks, cellular networks, wireless networks, or any combination of these or other such networks. In many implementations, the networks may include a plurality of subnetworks which may be of the same or different types, and may include a plurality of additional devices (not illustrated), including gateways, modems, firewalls, routers, switches, etc.

In some implementations, each operation performed by re-identification server 146 can be performed by user devices 140, 142, and 144. User devices 140, 142, and 144 can include a machine learning model (e.g., a neural network, random forest, support vector machine, etc.) that can determine the probability that a content provider provided user targeted content based on signal inputs into the machine learning model. The machine learning model can be implemented on a browser of user devices 140, 142, and 144. Examples of inputs that user devices 140, 142, and 144 can use to determine whether content the user receives is user targeted content or that the user is being tracked can include, but are not limited to, the content viewed by the viewer before receiving the content, characteristics of the previously viewed content, the content, characteristics of the content, a webpage the content will be provided on, characteristics of the webpage, etc. If the probability is above a threshold, user devices 140, 142, and 144 can prevent the content provider that provided the user targeted content from providing content to the user device in the future.

For example, a user device may visit a web page dedicated to shopping for shoes. The user device may retrieve multiple web pages showing shoes as a user of the user device determines which shoes to purchase. The user may stop shopping and go to a web page about pets. While viewing the web page for pets, the user can receive content shows similar to the shoes on the previous pages the user viewed. The browser of the computing device can implement the machine learning model as described below to determine whether the shoe content is user targeted content. The browser can use the previously viewed webpages and domains along with characteristics of the webpages as inputs along with inputs associated with the received content and the web page the content was provided on. The machine learning model can receive the inputs and determine a probability that the content is tracked content and/or that the content provider providing the content is tracking the user device. The browser can compare the probability to a predetermined threshold. If the probability is greater than the threshold the browser may determine the content to be user targeted content and/or that the content provider providing the content is tracking the user. The browser may stop the browser from receiving content from the content provider in the future. Otherwise, if the probability is below a threshold, the browser may determine the content to be provided based on the context of the webpage instead of being provided as a result of the user being tracked.

In some implementations, the user devices 140, 142, and 144 can retrieve logs of other user devices to determine intersections and/or signals or combinations of signals with the highest predictive ability, that the user devices 140, 142, and 144 viewed before receiving the content. If user devices 140, 142, and 144 viewed similar content before receiving the same content, a strong signal can be associated with the commonly viewed content when the similar content is used as an input into a machine learning model.

In some implementations, content provider 136 may be a third-party content provider that can track the web activity being performed at user devices 140, 142, and 144 and provide content to users at user devices 140, 142, and 144 related to the web activity. Content provider 136 can track the web activity despite the user implementing tracking prevention techniques (e.g., disabling third-party cookies per website/domain or through the web browser, using proxies or VPNs, a user agent scrub, identifying a unique ID of content provider 136 and refusing data associated with the ID, reducing emails from email addresses associated with content provider 136, reducing phone calls from numbers associated with content provider 136, etc.). Content provider 136 can use data gathered from the tracked web activity to continue to provide user targeted content related to the tracked web activity.

For example, a user may open a web browser at user device 140 and immediately be presented with an option to enable or disable third-party cookies. The user can select the option to disable third-party cookies as the user wants to keep his/her privacy and does not want to be tracked while browsing the internet. Depending on if a website or web browser presented the user with the option to block third-party cookies, the website or web browser can then block any third-party cookies to be installed on the user device. Content provider 136 can still track the activities at user device 140, however, using a variety of techniques (e.g., deterministic or probabilistic methods, email-based identity synchronization, phone-based identity synchronization, server-to-server synchronization, remote procedure call applications, etc.). Content provider 136 can use the tracked activities to identify characteristics of the activities that a user is associated with and select content from content 138 associated with the identified characteristics at a spot dedicated to receiving and presenting content from content providers.

For example, a user at user device 140 may be tracked by content provider 136 using one of the techniques listed above. The user may visit a web page related to shoes while viewing different web pages. Content provider 136 can identify that the user visited the web page related to shoes and identify content 138 that is related to shoes. As the user visits websites and domains related to other topics, sports for example, user device 140 can send a request to content provider 136 for content to display in a dedicated content space and content provider 136 can provide content related to shoes based on the user visiting a web page related to shoes. In some implementations, the request to content provider is first transmitted to re-identification server 146 before being transmitted to content provider 138.

Re-identification server 146 may comprise one or more servers or processors configured to determine if content providers 136 or 138 are tracking web activity of users at user devices 140, 142, and 144 and/or if content served by content provider 136 or 138 is user targeted content, in some implementations. Re-identification server 146 is shown to include processor 148 and memory 150, in some implementations. Re-identification server 146 can be configured to identify whether users have granted third parties consent to identify them and track their web activity, identify content providers that may be tracking the users and providing content to the users, implementing a neural network with different inputs associated with the users and their past web activity to determine if a content provider is tracking users and/or content provided by the content provider is user targeted content, counting how often the content provider has been determined to be tracking users or provided user targeted content, and transmitting requests for additional content from user devices 140, 142, and 144 to content providers based on whether the content providers were determined to be tracking users or providing user targeted content. One or more components within re-identification server 146 can facilitate communication between each component within re-identification server 146 and external components such as content providers 136 and 164 and user devices 140, 142, and 144. Re-identification server 146 can include multiple connected devices, with each device providing portions of the necessary operations (e.g., as a server bank, a group of blade servers, or a multi-processor system).

Processor 148 may comprise one or more processors configured to perform instructions on modules in memory 150 within re-identification server 146, in some implementations. In some implementations, processor 148 executes an analyzer (not shown) to execute modules within memory 150 that may be configured to determine if a third party is tracking web activity of users using the Internet. To do so, the analyzer can perform instructions stored in memory 150 of re-identification server 146. Memory 150 is shown to include an authorizer 152, a content identifier 154, a provider identifier 156, a counter 158, an application 160, and a transmitter 162, in some implementations. By executing the analyzer to perform the operations of each component 152, 154, 156, 158, 160, and 162, processor 148 can automatically determine a probability that content provider 136 (or any other content provider) is serving user targeted content to user devices 140, 142, and 144 on the Internet after the users expressly select an option to not be tracked by third parties. Processor 148 can implement a neural network with application 160 to determine a probability that content provider 136 is serving user targeted content using unauthorized re-identification techniques. Processor 148 can compare the probability to a threshold to determine if the probability is high enough to restrict the ability of content provider 136 to provide content to user devices over the web. In some implementations, processor 148 may comprise or may communicate with a co-processor, such as a tensor processing unit (TPU) that is solely dedicated to using machine learning techniques to determine the probability that content provider 136 is serving user targeted content or the content was served as a result of tracking users.

Authorizer 152 may comprise an application, server, service, daemon, routine, or other executable logic to identify users that have selected an option to disable third party identification/tracking, in some implementations. In some implementations, authorizer 152 provides users with an option (e.g. via a user interface, provided web page, etc.) to enable or disable third party tracking that is performed through the use of cookies and used to select user targeted content for each user. Users can select either option. Authorizer 152 can also provide an option for users to enable or disable first party cookies, which allows websites and/or domains to store data related to the user and that is specific to each website. For example, a shopping website may include a virtual shopping that contains the items that a shopper wishes to purchase. First party cookies can allow the items to remain in the shopping cart while shoppers continue shopping instead of disappearing once the shopper leaves a page associated with the shopping cart. First party cookies can also be useful to store user names and passwords of users at a user device so the user does not have to continually input their username and password upon reentering the website. Unfortunately, if first party cookies are enabled, third parties can track the web activity of the users using first party cookies through server-to-server synchronization techniques.

Upon receiving a selection to disable user tracking and consequently third party cookies, authorizer 152 can automatically block third party cookies from being stored at an associated user device. Authorizer 152 can block third party cookies specific to a domain that the user was using when presented with the option to disable tracking or across all domains via the web browser. In some implementations, blocking third-party cookies can be a default setting for individual domains or web browsers. Consequently, in these implementations, third party cookies can automatically be blocked by authorizer 152 unless the user manually changes the settings to enable third party tracking. Although shown on the server, in many implementations, user authorization may be controlled by an authorizer executed by a user computing device, such as a do-not-track flag controlled by a browser or other application executed by the user computing device.

In addition to presenting users with the option to enable or disable third party tracking, authorizer 152 can store indications associated with each computing device indicating that a user of a user device does not wish to be tracked. Authorizer 152 can receive an indication from user devices 140, 142, or 144 indicating that a user has either selected an option to disable third party tracking or that the user device may be automatically blocking third party tracking via cookies via a web browser. After receiving the indication, authorizer 152 can identify to content identifier 154 that the user does not wish to be tracked by third parties.

Content identifier 154 may comprise an application, server, service, daemon, routine, or other executable logic to track web activity of users that have been determined by authorizer 152 to have opted out of being tracked by third parties and to determine the content of the web activity, in some implementations. Content identifier 154 can receive indications from authorizer 152 that indicate users that have optioned not to accept third party tracking, either automatically through the web browser or by selecting an option to disable the tracking. As users browse the Internet via a web browser, content identifier 154 can generate a log of the websites, domains, and keyword searches the users visit and/or input into the browser and store the log in a database (not shown) within re-identification server 146.

When generating logs of data associated with each user and storing the logs in the database, content identifier 154 can identify the content of each web page, domains, and key words each user visits or inputs into a respective user device of each user. Content identifier 154 can identify the content of domains or webpages by comparing the domain to a table within a database of re-identification server 146. The table can include content information related to different domains or web pages associated with the Internet. For example, a domain may be associated with training pets. The table would have the domain name (or web page URL) in one column and then a content descriptor in another column indicating that the domain is directed to training pets. If a user visits the domain related to training pets, content identifier 154 can identify the domain from an associated URL and determine that content of the domain is related to training pets by finding the domain and associated content in the table containing the relevant information. In some implementations, instead of using the URL of domains to determine content, content identifier 154 can use the most common content of web pages associated with the domain to determine content associated with the domain. Content identifier 154 can determine the content of domains using any technique or method.

Content identifier 154 can identify content of different web pages associated with a domain that users visit. To do so, content identifier 154 can identify common terms and/or patterns of terms that appear on each web page. For example, if a user is viewing a web page describing shoes, content identifier 154 can identify terms associated with shoes such as heels, different shoe brands, different shoe types, etc. Content identifier 154 can identify the words associated with shoes and determine that the web page is associated with shoes if thresholds requiring a number of words related to shoes are met.

In another implementation, content identifier 154 can identify content associated with a web page by analyzing pictures or other content embedded on the web page, including videos, audio, text, etc. For example, content identifier 154 can scan the web page for media or other content items, identify any media on the web page, and then determine the content of the web page based on the content of the media. In some implementations, content identifier 154 can determine the content of pictures or images within videos using object recognition techniques. For example, content identifier 154 can identify characteristics of pictures of content and compare the characteristics to pictures that have been tagged with tags identifying content the pictures are associated with. If content identifier 154 can identify enough characteristics of the picture that are the same or similar to the tagged picture, content identifier 154 can determine content of the picture and consequently the content of the web page. For example, if a web page includes a picture of a shoe, content identifier 154 can identify characteristics of the shoe and compare the characteristics of a picture of a shoe within a database within re-identification server 146. If content identifier 154 identifies enough common characteristics (i.e. enough characteristics to meet a threshold), content identifier can determine that content associated with the picture is a shoe and the web page is associated with shoes. Content identifier 154 can identify content associated with web pages using any technique or method.

To identify the content of keywords, or terms used in searches or typed into a user device, content identifier 154 can identify the words in the searches and compare the words to words in a database (not shown) within re-identification server 146. The database may include terms that are each tagged with a type of content indicating what content the words are associated with similar to how domains are tagged with a type of content. Content identifier 154 can compare the keywords to words in the database and determine content that is associated with each keyword based on the content tag of a matching word in the database. Content identifier 154 can identify types of content associated with keywords using any technique or method.

Upon identifying content that is associated with each keyword, web page, and/or domain, re-identification server 146 can tag each keyword, web page, and/or domain with a tag indicating what type of content it is associated with. For example, if a user performs a search using the term "dog" in a Google search engine and visits a domain associated with dogs, content identifier 154 can automatically determine that the content associated with the keyword "dog" and the domain is dogs. Content identifier 154 can then tag the keyword and domain with a tag associated with dogs, add the keyword and domain to a log of keywords, web pages, and domains the user has visited within a set time period, and store the log within an associated database within re-identification server 146. The content of the keywords, web pages, and domains can be characteristics of the respective keyword, web page, and domain and be used as an input into a neural network as described below.

In some implementations, content provided by content provider 136 can also be included in the log of content and tagged with a tag indicating what type of content it is associated with. For example, a content provider may send content related to selling a car. Content identifier 154 can identify the content, tag the content with a tag indicating that the content is associated with cars, and add the content to a content log.

Content identifier 154 can generate, update, and store logs of data associated with web activity of a user at a user device 140, 142, or 144, for any length of time. In some implementations, content identifier 154 can generate and store a rolling window time period that includes recent data from a time period immediately before the current time period. For example, content identifier 154 can store data in a log that is associated with the previous 30 days of web activity of a user. As each day passes, data from before the 30-day time period can be removed and new data from the current day can be added to the log, in some implementations. Consequently, content identifier 154 can track the current interests of users at user devices 140, 142, and 144 and the data may not be impacted by searches, web pages, and domains from an undesirable time period of the user. The rolling window time period can be of any duration.

In some implementations, the log can be stored on user devices 140, 142, and 144. The log can be provided to re-identification server 146 upon a request to determine whether the content is user targeted content and/or whether the content provider that provided the content is tracking the user device receiving the content. Further, if the methods described herein are performed on a user device, the log can be used without transmitting the log to another user device or server. Advantageously, by storing the log on user devices 140, 142, and 144, each of user devices 140, 142, and 144 can store private data without sharing the data with a server. A user of the user devices 140, 142, and 144 may not wish to share the data of the logs with other user devices or servers.

Referring still to FIG. 1B, re-identification server 146 is shown to include application 160. Application 160 may comprise an application, server, service, daemon, routine, or other executable logic to implement inputs into a neural network, shown and described with reference to FIG. 2 below, to determine if content providers, such as content providers 136 and 164 are serving user targeted content after the users have selected an option to not be tracked. Application 160 can receive inputs identified by content identifier 154 that are associated with recent web activity of multiple users and content presented to the multiple users. Through the neural network, application 160 can use weights associated with the inputs to determine an output probability indicating a likelihood that a content provider is serving user targeted content. In some implementations, the neural network can be a binary classifier that provides two outputs, one output indicating that a content provider is serving user targeted content, and another output that indicates that the content provider is serving contextually targeted content based on inputs related to web activities of different users. There can be any number of inputs and each input can be associated with any weight. In other implementations, application 160 implements statistical analysis or linear regression models, random forest, Gradient boosting decision tree, etc. instead of a neural network to determine a probability that a content provider is tracking users or that particular content is targeted.

One input that application 160 can implement into the neural network of application 160 is a log of content items generated or selected by content identifier 154 that includes the content that users viewed before receiving content from content provider 136. In some implementations, application 160 can specify a time period to receive data from the log, such as, for example, 30 days before the user viewed the content. Application 160 can identify viewed content from any time period. Application 160 can identify the content and a type of content associated with the content by identifying tags associated with the content in the log of content items. As described above, the content and type of content can be associated with keywords, web pages, domains, etc. Once the content items are identified, application 160 can input content items into the neural network of 160 to determine a probability that a content provider provided user targeted content to a user device while being unauthorized to do so. In some implementations, the content items can be compared to a provided content item, any content items that are similar to the provided content item can have a stronger weight. Stronger weight can also be referred to as a heavier or higher weight as described herein.

In some implementations, inputs from the log of content items can include an intersection and/or signal or combination of signals between a first set of identifications of the log of content items and a second set of identifications of the log of content items. The content in the intersection and/or the signal or combination of signals with the highest predictive ability can be inputs into the neural network. A set of identifications can be associated with web activity of a particular user. For example, content identifier 154 may track the content viewed or input into a user device by a particular user, user A, for 15 days before user A viewed a particular piece of content provided by a content provider. Each activity of user A (e.g. each web page or domain visited or keyword input into a user device) can be generated by application 160 into a first set of identifications. Sets of identifications can be generated for any number of users that viewed the same content provided by a content provider for any time period. Consequently, if a second user also viewed the same content provided by the content provider, application 160 can identify content items from the web activity of the second user as a second set of identifications. Application 160 can determine the intersection and/or the signal or combination of signals with the highest predictive ability between the first set of identifications and the second set of identifications to be common content that the first user viewed and the second user viewed at a predetermined time period before viewing content provided by a content provider. The predetermined time period can be of any length.

For example, if user A and user B were both presented with the same content associated with content provider 136, application 160 can identify all the content users A and B viewed before being presented with the content. User A may have visited web pages C, D, E, and F and user B may have visited web pages D, E, F, and G. Application 160 can determine the intersection and/or the signal or combination of signals with the highest predictive ability of the viewed content to be web pages D, E, and F for the two users. Application 160 can input the web pages D, E, and F into the neural network as inputs associated with an intersection between users A and B. The neural network can use the inputs and weights associated with the inputs to determine a probability that a content provider is tracking web activity of users A and B or that a particular piece of content is targeted. Application 160 can obtain the probability and compare the probability to a predetermined threshold, such as 80%. If the probability is above the threshold, application 160 can determine the content provider that provided the content is tracking users (or is providing user targeted content) and send a signal to transmitter 162 indicating for transmitter 162 to stop providing content from the identified content provider to user devices sending requests for content. In other implementations, application 160 may use as inputs an identification of web pages C, D, E, F, and G, and the neural network may weight more heavily the web pages common to each user (e.g. D, E, and F) and less heavily the web pages viewed only by one user (e.g. C and G). Thus, the intersection and/or the signal or combination of signals with the highest predictive ability may not need to be explicitly identified, but may be implicit in the machine learning model once trained.

Application 160 can obtain data associated with a signal or combination of signals with a highest predictive ability. The signals or combinations of signals with the highest predictive ability can be signals or combinations of signals associated with the highest weights or scores when used to determine whether content provided to a user is user targeted and/or if a content provider is tracking the user. In some embodiments, the predictive ability can be based on a number of users that viewed the same content before receiving content from a content provider. The signals can have a highest predictive ability if, for example, a large number of users visited the same web page or domain before receiving the same content. The larger the number, the higher the predictive capability. In some embodiments, the predictive ability can be based on similarities of characteristics between received content and content viewed before receiving the content. In some embodiments, the signals or combinations of signals can include or be intersections of content viewed by multiple users before receiving the same content. The intersection can be matching signal inputs (e.g., signal inputs associated with the same content and/or content characteristics) into a trained machine learning model.

The highest predictive ability of a signal or combination of signals can be positive or negative. In some embodiments, the highest predictive ability can be positive if the signals or combinations of signals indicate a high likelihood that content is user targeted or that a content provider is tracking users. For example, content that has been commonly viewed by multiple users before the users receive content from a content provider can be associated with a positive predictive ability. In some embodiments, the highest predictive ability can be negative if the signals or combinations of signals indicate a strong likelihood that content is not user targeted. For example, a signal or combination of signals may be associated with a web page that is associated with a negative predictive ability because users who visit the web page receive contextually targeted content after visiting the web page.

Application 160 can obtain data associated with intersections and/or signals or combinations of signals with the highest predictive ability for any number of users. For example, continuing with the example above, if a third user, user C, views the same piece of content as users A and B and application 160 determines via content identifier 154 that user C viewed web pages D, E, and G, application 160 can determine an intersection and/or a signal or combination of signals with the highest predictive ability of web pages D and E between users A, B, and C. The intersection and/or the signal or combination of signals with the highest predictive ability between users A, B, and C, can be inputs into the neural network along with the intersection and/or the signal or combination of signals with the highest predictive ability associated with A and B. In some implementations, the intersection and/or the signal or combination of signals with the highest predictive ability between users A, B, and C can be associated with a stronger weight, or stronger signal, in the neural network when the neural network automatically determines the probability that a content provider is tracking users or that a piece of content is targeted.

Intersections and/or signals or combinations of signals with the highest predictive ability can be determined for any number of viewers that viewed the same content. The more common the sites viewed between the larger amounts of people, the larger the weight the common sites will have and the higher the chance that the neural network will determine that a content provider is tracking users or that a piece of content is targeted. If, however, there is not a strong correlation between previous sites viewed by viewers of the same content, the neural network may determine that there is a small probability that a content provider is tracking users or that a piece of content is targeted.

For example, content may be provided to a large number of users. Of the users that viewed the content, 50% of the users may have visited website A, 30% of the users may have visited website B, and 20% of the users may have visited website C. The neural network will weight signals or combinations of signals associated with websites A, B, and C according to the percentage of users that visited each site. Website A could be associated with signals or combinations of signals that have the biggest weight, followed by website B, and further followed by Website C. In some implementations, the weights can directly correlate with the percentage of users that visit the websites, although in other implementations, weights may be non-correlated with the percentage of users that visited the corresponding websites (e.g. if some website is consistently associated with tracking users or providing user targeted content, then it may be weighted more heavily, despite a fewer percentage of users visiting the site). Continuing with the above example, signals or combinations of signals within the neural network associated with website A may be 2.5 times as strong as signals or a combination of signals associated with website C because 50% of the users visited website A and 20% of the users visited website C.

In some implementations, weight associated with inputs can further be based on when users viewed content in relation to being provided with content from a content provider. The closer in time that the users viewed content that intersects with content viewed by other users to content from the content provider, the stronger the weight or signal associated with the intersection and/or the signal or combinations of signals with the highest predictive ability. For example, if users A and B both viewed Website C 30 minutes before being provided with content from a content provider, the neural network could weight the input associated with website C more strongly than a website that users A and B both visited a week before being provided with the content. Users A and B may have viewed website C at different times in relation to being provided by content provider, however, application 160 take account for these differences by taking the average of the resulting time, adding the time together, or any other means of normalizing the time difference between the two users. The weight of the neural network input could be correlated with the time between viewing the content and a website or an order of common websites visited where weights of the inputs are just associated with the order that users A and B visited the websites, for example.

In some implementations, characteristics of the content of the intersections and/or signals or a combination of signals with the highest predictive ability can be associated with different weights based on their similarity to content provided by a content provider, and be used as inputs into the neural network of application 160. Characteristics of the intersecting web pages, keywords, or domains can each be an input and have a unique weight associated with it. Examples of characteristics include, but are not limited to video, image, text, colors, etc. Characteristics can also include a type of content. For example, characteristics can include what the content is focused on different subjects such as animals, cars, shoes, sports, education, schools, etc. In some implementations, weights of the characteristics can depend on the weights described above, with characteristics of the most commonly visited content having stronger weights than characteristics of content that is not commonly accessed before users are presented with content from a content provider. Further, the more similar the characteristics are to characteristics of the provided content, the stronger the weight associated with signals or a combination of signals of the characteristics. Characteristics of content viewed temporally closer to the content from the content provider can also be associated with a stronger signal. The temporal relationship between content and provided content can also be an input into the neural network.

In some implementations, application 160 can identify web pages that provided content was viewed on by different users as inputs into the neural network. Because web page owners generally provide content from content providers that is related to the web page, a web page that includes content from content providers that is not related to the web page indicate a high likelihood that the provided content was provided as a result of being tracked by a third party content provider. The neural network can identify similarities between the web page and the provided content. The fewer the similarities, the higher the weight associated with the web page will be. For example, if a user is viewing a web page describing cars and content related to shoes is provided by a content provider to the web page, the neural network may associate a higher weight with the web page than if the content provided by the content provider was also related to cars. Further, characteristics of web pages can be inputs into the neural network similar to characteristics of the intersections and/or signals or combinations of signals with the highest predictive ability as described above.

In some implementations, another input into the neural network can be the content provided by a content provider. Application 160 can identify the type of the content as an input to the neural network. This is beneficial because some types of content can be more likely to be provided by content providers that are tracking users than other types of content. For example, application 160, through the associated neural network, can determine that content of content providers related to shoes is more likely to be associated with unauthorized tracking of users than content related to sports. Consequently, weights associated with inputs of content related to shoes can be higher than weights of inputs of content related to sports in the neural network. Different types of content can have any weight.

As will be described in more detail with reference to FIG. 2, the neural network can account for different weights based on how many users visited or viewed the same content before being provided with content by a content provider by implementing a neural network that can have any number of hidden layers. Weights associated with different inputs and hidden layers can be adjusted so both the temporal element of viewing content before receiving content from a content provider and the number of users that view the same content before being presented with content from a content provider can be weighted appropriately. Using various training techniques to train the neural network, such as by using reference materials and back propagation after determining a probability that a content provider is tracking users or a piece of content is user targeted content, the neural network can automatically learn appropriate weights for different inputs and consequently create an algorithm that can accurately determine a probability that an unauthorized content provider is tracking web browser users or providing user targeted content to the web browser users.

After determining a probability that a content provider is tracking users or that content is providing targeted content to users that expressly removed any potential consent for the content provider to do so and determining that the probability is above a predetermined threshold, application 160 can send a signal to transmitter 162 indicating for transmitter 162 to prevent the content provider from receiving any future transmissions of requests from the user devices to the content provider. Transmitter 162 may comprise an application, server, service, daemon, routine, or other executable logic to transmit requests for content received from user devices 140, 142, and 144 and sent to content providers. In some implementations, content providers can send content through transmitter 162 back to user devices 140, 142, and 144. In other implementations, content provider 136 sends the content directly to user devices 140, 142, and 144. Transmitter 162 can prevent transmission of requests for content from user devices 140, 142, and 144 to content providers.

In some implementations, such as where the server acts as an intermediary between clients requesting additional content from content providers, transmitter 162 can prevent transmission of requests from user devices 140, 142, and 144 to content providers that re-identification server 146 has determined to have provided unauthorized targeted content to user devices 140, 142, and 144. For example, application 160 may determine that content provider 136 provided targeted content to one of user devices 140, 142, and 144 as the user device browse the internet. Application 160 can send a signal to transmitter 162 indicating that content provider 136 has provided user targeted content to a user device and transmitter 162 can redirect any future requests from the user device to content provider 164. In some implementations, transmitter 162 can redirect requests from all user devices while in other implementations transmitter 162 can redirect requests from user devices that content provider 136 has been caught providing user targeted content to.

In some implementations, before redirecting requests for content from content provider 136, transmitter 162 can send a notification to a user device being tracked indicating that the user device is being tracked. Transmitter 162 can also send a signal to the user device indicating content received by the user device is user targeted content. A user at the tracked user device may be presented with an option to either continue allowing content provider 136 to provide content to the user device or to block future content from content provider 136. For example, transmitter 162 may send the user device the following message: "We believe content provider 136 is trying to track you against your consent. Would you like to block their cookies? Would you like to use our proxy/VPN service to help keep your privacy safe?" The user can select options associated with these questions and re-identification server 146 can provide an appropriate service. In other implementations, content providers that have been identified as likely tracking users, providing targeted content to the users, may be identified to each client device (e.g. in a blacklist or other list), and client devices may be configured not to transmit requests to such content providers or may ignore or block content received from such content providers.

In some implementations, transmitter 162 can stop content providers from providing content to user devices by blocking all content sent from the content provider. Transmitter 162 can do so even if a user device requests content from the specific provider. In some implementations, transmitter 162 can generate and send a report to regulators indicating that the content provider is tracking users or providing user targeted content to the users against the wishes of the users. In some implementations, transmitter 162 can transmit a message to a news outlet that can inform the public that a particular content provider is tracking users, even if the users specifically opt not to be tracked.

To prevent requests for content from being sent to content providers, transmitter 162 may need to identify the content provider that is tracking users or providing user targeted content to users. To do so, transmitter 162 may send a signal to provider identifier 156 to identify the content provider performing unauthorized tracking. Provider identifier 156 may comprise an application, server, service, daemon, routine, or other executable logic to identify content providers that are tracking users and providing user targeted content despite users explicitly taking steps to stop them. Provider identifier 156 can identify the providers by identifying the user targeted content and probing the source of the user targeted content. Often the source of the user targeted content has left a fingerprint on the content, such as a tag indicating where the content came from, that provider identifier 156 can use to identify the provider. In some implementations, a fingerprint of the content provider can be stored in the web browser that displayed the content to viewers. Provider identifier 156 can identify the provider from the fingerprint associated with the web browser.

In some implementations, a positive identification of unauthorized tracking or of user targeted content may not be enough for application 160 to determine that a content provider is tracking users or providing user targeted content to the users against their wishes, despite having a probability that is over a predetermined threshold. In these implementations, application 160 may require that content identifier 154 identify a second content item provided by the content provider identified by provider identifier 156 to be tracking users or providing content to the users against their wishes and application 160 can again determine a probability for if the identified content provider is tracking users against their wishes or if the content is user targeted content. Application 160 can do so based on intersections and/or signals or combinations of signals with the highest predictive ability of content viewed before users received a second content item from the same identified content provider, a comparison of the provided content with web pages the provided content is being displayed on, and content of the provided content. If application 160 again determines that the content provider is performing unauthorized tracking of users or that the content is user targeted content, transmitter 162 can redirect any requests for content from user devices directed to the content provider determined to be tracking or providing user targeted content to users against their wishes.

In some implementations, re-identification server 146 implements counter 158 to determine a number of times that a particular content provider has been determined to be tracking users or content provided by the content provider is user targeted content after the users take measures to avoid being tracked. Counter 158 may comprise an application, server, service, daemon, routine, or other executable logic to increment a counter at every instance that application 160 determines that a content provider has been determined to be tracking users or providing targeted content to users against their wishes. At each instance, counter 158 can increment a counter associated with a particular content provider by one. In some implementations, the components of re-identification server 146 may not prevent the content providers from receiving requests for content until the counter associated with the content providers reaches a predetermined threshold. Upon reaching the threshold, transmitter 162 can perform the systems and methods described herein to prevent requests from user devices from reaching the content provider associated with the counter.

In some implementations, a user can reset the identifications of content providers that provided user targeted content or that are tracking users. The user can access the computing device that received the user targeted content or that was tracked by content providers and choose an option to remove each content provider determined to have provided user targeted content or determined to be tracking users from an internal list keeping track of identified content providers. The computing device can send a signal to re-identification server 146 indicating for the re-identification server 146 to allow transmission of requests and content to and from content providers that were on the list. The user can select all or a portion of the content providers that were on the list. In some implementations, if the methods described herein are performed on a user device, the user device can request and allow content to be provided from the selected content providers.

Figure 2:
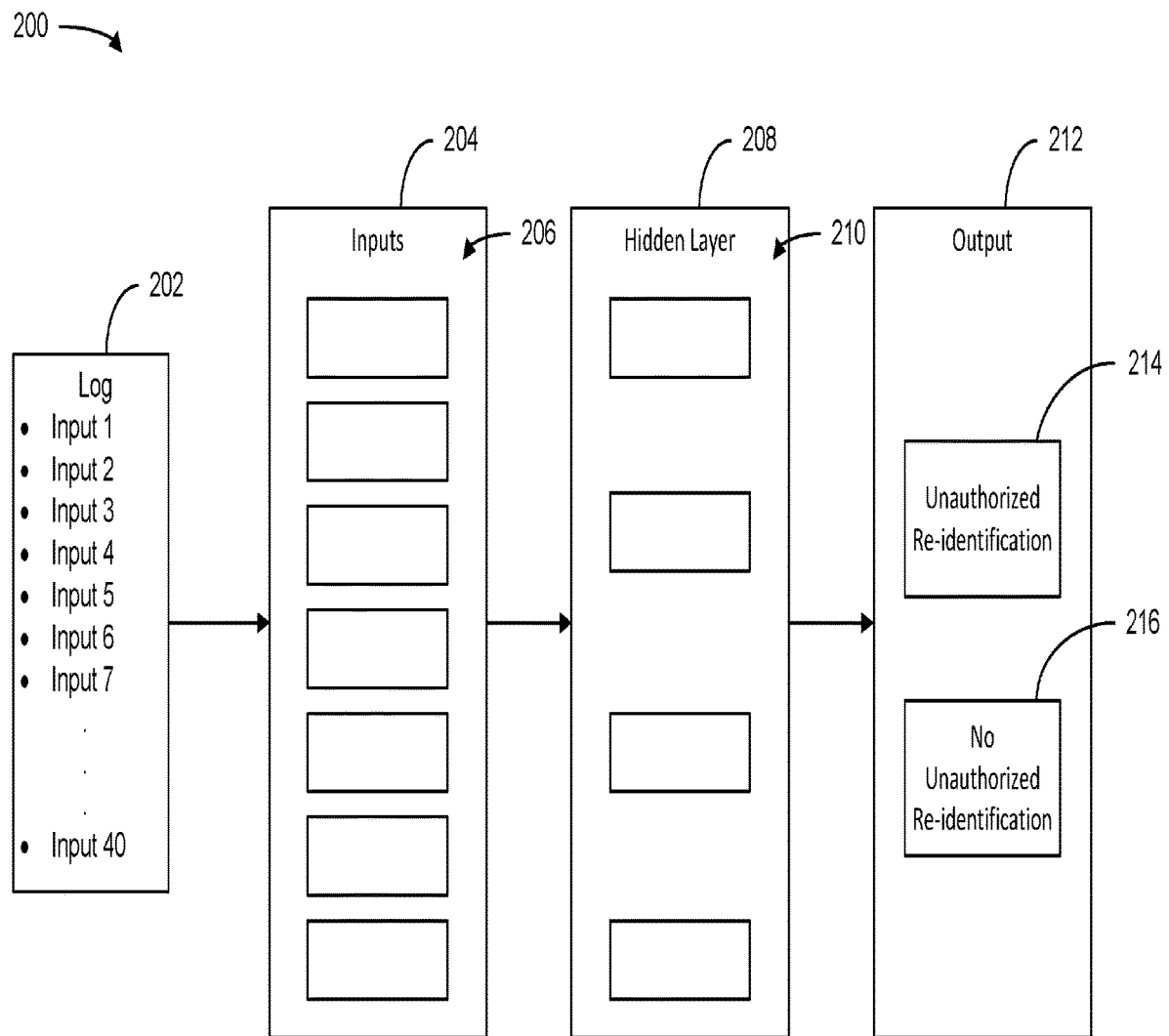
FIG. 2 is a block diagram of a machine learning model with inputs from a history of viewed content by users and outputs indicating whether a third party is tracking the activity of the users, according to some implementations.

Referring now to FIG. 2, a block diagram of a neural network 200 with inputs from a history of viewed content by users and outputs indicating whether a third party is tracking the activity of the users or content is user targeted content is shown, according to some implementations. Neural network 200 can be a part of application 160, shown and described in reference to FIG. 1B, and is shown to include a log of content items 202, inputs 204, a hidden layer 208, and an output layer 212, in some implementations. Neural network 200 can include any number of components. In some implementations, neural network 200 can be implemented by a tensor processing unit dedicated to using machine learning to determine if content providers are performing unauthorized tracking or if content is user targeted content. Neural network 200 can include any number of components. Neural network 200 can operate as a log of content items 202 generated by re-identification server 146, shown and described with reference to FIG. 1, is used as an input into inputs 204. Signals or combinations of signals from inputs 204 can be associated with weights and transmitted to hidden layer 208. Signals or combinations of signals from hidden layer 208 can be associated with weights and transmitted to output layer 212. Components 202, 204, 208, and 212 of neural network 200 can be implemented to determine a probability that a content provider is performing unauthorized tracking of different users or content is user targeted content. Although shown with one hidden layer, in some implementations, neural network 200 may comprise more than one hidden layer.

Log of content 202 can be a log of content items provided by anonymized computing devices, in some implementations. Re-identification server 146 can retrieve log of content 202 from web browsers associated with different computing devices that were provided with a same piece of content. Log of content 202 can include browsing histories associated with the different devices that includes the web pages different users viewed; keywords users typed in, selected or that are associated with web pages or domains; and domains that users accessed. In some implementations, log of content 202 can include characteristics of each of these web pages that are identified by re-identification server 146. Log of content 202 can also include intersections and/or signals or combinations of signals with the highest predictive ability of the same content that multiple users viewed before receiving a same content item from a content provider. Log of content 202 can also include the content item that a content provider provided multiple users along with web pages that the content item was displayed on. Further, log of content 202 can include a landing page associated with the content item that a user lands on upon clicking on the content item. Log of content 202 can include any number of content items and content of any type.

Inputs 204 is a first layer of neural network 200 that represents the input layer of neural network 200. Inputs 204 can receive the contents of log of content 202 at nodes 206 as inputs in neural network 200. Each input can be a node associated with an input of log of content 202 that sends a signal to each node of nodes 210 of hidden layer 208. Inputs from log of content 202 can be converted, by re-identification server 146, into numerical values, binary code, matrices, vectors, etc., based on an identification of the inputs with numbers in a database within re-identification server 146. Inputs can be a provided content item; characteristics of the provided content item; web pages; domains; keywords; what the inputs are (i.e. intersections and/or signals or combinations of signals with the highest predictive ability, the provided content, the content landing page, etc.) and characteristics of the web pages, domains, other inputs. For example, an intersecting web page of log of content 202 can be associated with a number, 12, for example, based on characteristics of the web page (i.e. a web page can include characteristics common to content provided by a content provider, the more similar common characteristics, the higher the value). Re-identification server 146 can convert all inputs from log of content 202 into numbers based on the inputs correlated number in a database within re-identification server 146. Re-identification server 146 can then normalize the numbers into values between −1 and 1 using any technique so operations can be performed on the numbers by nodes 210 of hidden layer 208. Re-identification server 146 can normalize the numbers into any value ranges. After re-identification server 146 converts the numbers to values between −1 and 1, neural network 200 can implement weights associated with each input and signal from each of nodes 206 and the signals or combinations of signals can be transmitted to hidden layer 208.

Hidden layer 208 is a layer of nodes 210 that receives input signals or combinations of signals from inputs 204, performs one or more operations on the input signals or combinations of signals, and provides signals or combinations of signals to output layer 212. While one hidden layer is shown, there may be any number of hidden layers. In some implementations, hidden layer 208 can be correlated with the number of users that viewed similar content before viewing the content of a content provider. Neural network 200 can perform operations, such as multiplication, a linear operation, sigmoid, hyperbolic tangent, etc., at hidden layer 208 based on the values of nodes 206 and the weights associated with signals or combinations of signals transmitted between nodes 206 and nodes 210 of hidden layer 208. Signals or combinations of signals from nodes 210 can be sent to output layer 212 and each of these signals or combinations of signals can be associated with weights.

Output layer 212 can be a layer of neural network 200 that is dedicated to providing a probability that a content provider is tracking users after the users unauthorized them to do so or if content is user targeted content. Output layer 212 is shown to include two nodes, unauthorized re-identification 214 and no unauthorized re-identification 216. Each node is associated with a probability determined by neural network 200 based on inputs from log of content 202. If the inputs indicate that it is likely a content provider is tracking users, or that content is user targeted content, unauthorized re-identification 214 can be associated with a high probability (probabilities over 50%, for example) and no unauthorized re-identification 216 can be associated with a low probability (probabilities below 50%, for example). After probabilities are associated with each of unauthorized re-identification 214 and no unauthorized re-identification 216, re-identification server 146 can compare the probabilities to thresholds determined by an administrator to determine if a content provider is tracking users against their wishes or if content is user targeted content.

The weights associated with signals or combinations of signals that travel between inputs 204 and hidden layer 208 and then between hidden layer 208 and output layer 212 can be automatically determined based on training data provided by an administrator. The training data can include content and characteristics of content as inputs to neural network 200 and an expected output based on the inputs. Neural network 200 can initially have randomized weights associated with each of its signals or combinations of signals, but after a sufficient amount of training data has been input into neural network 200, weights can be determined to get to a degree of certainty that an administrator identifies as sufficient. In some implementations of the systems and methods described herein, the inputs and signals or combinations of signals that are associated with the highest weight can be characteristics associated with content provided by a content provider, a landing page, and the domain that the content was displaying on when being displayed. Other inputs can include similarities of content provided by a content provider. To use the training data, neural network can be a supervised system that implements back propagation. After training data is used as an input and the neural network identifies probabilities of an output, the neural network can identify an expected output from the training data and identify the difference between the actual output and the expected output. The neural network can identify the difference as a delta and modify the weights so the actual outputs are closer to the expected outputs. The neural network can modify weights of its signals or combinations of signals using a learning rate that identifies a degree of change of each weight for iteration of training data that is implemented into neural network 200. As more and more training data is fed into the neural network, weights of signals or combinations of signals could change and delta could become smaller. Consequently, the results can become more accurate, in some implementations.

In some implementations, neural network 200 can be a semi-supervised system where training data used as an input into the system includes data that is labeled with and without output data and with input data. This is advantageous when there is a large amount of data available but it would take humans a large amount of time to label the data with the correct outputs. In the semi-supervised system, neural network 200 can receive data that just includes inputs to determine outputs and label the data based on the output. The newly labeled data can then be implemented into neural network 200 with the labeled dataset to train neural network 200 using back propagation techniques. Using the semi-supervised system, neural network can continuously update as it identifies content and determines if a content provider that provided the content tracked users against the wishes of the users or if content is user targeted content.

Figure 3:
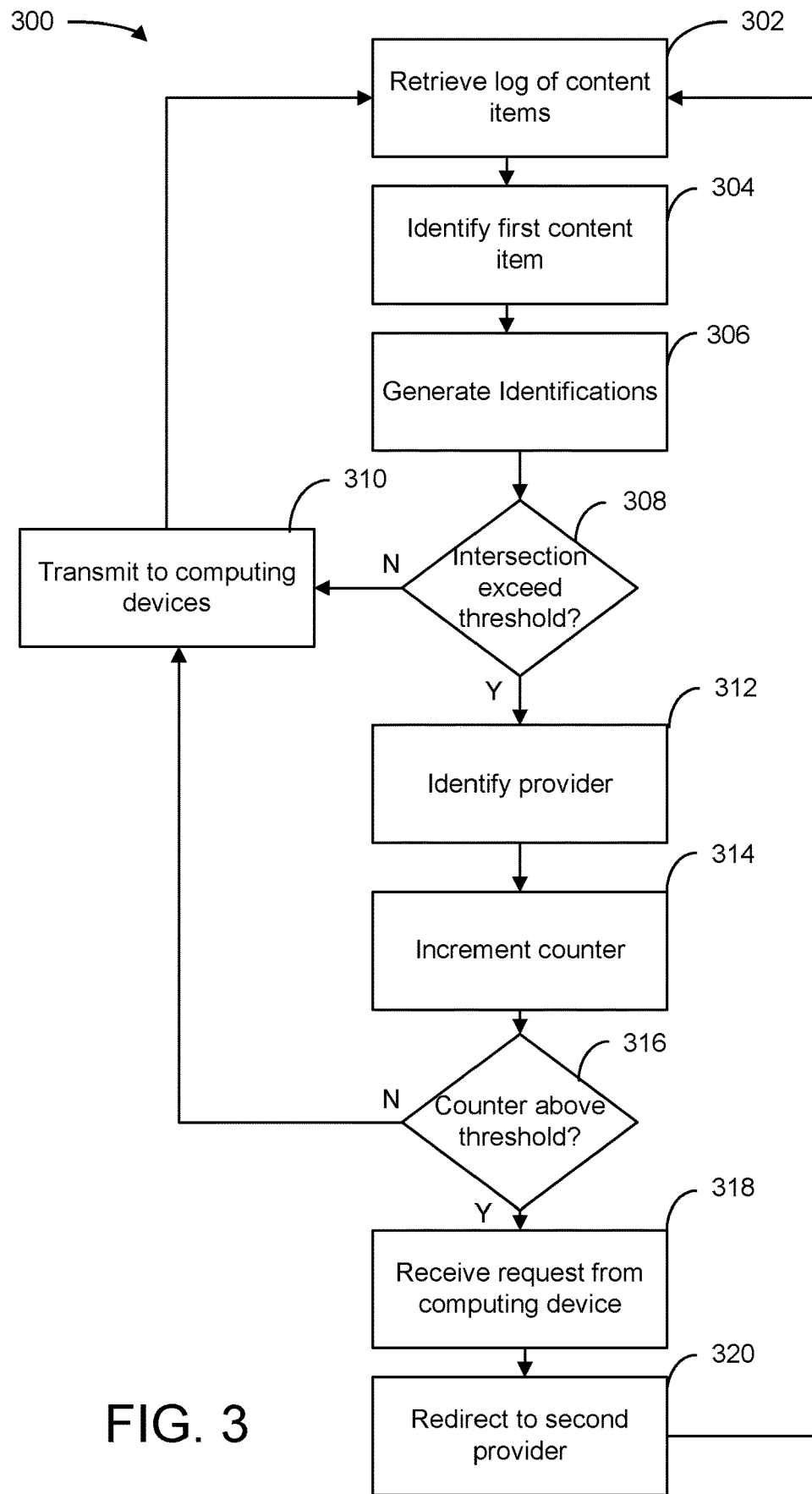
FIG. 3 is a flow chart illustrating a method for determining if a third party is tracking activity of users based on outputs from the neural network, according to some implementations.

Referring now to FIG. 3, a flow chart illustrating a method 300 for determining if a third party is tracking activity of users based on outputs from the neural network or if content is user targeted content is shown, according to some embodiments. Method 300 can include any number of operations. At an operation 302, a re-identification server can retrieve a log of content items. The log of content items can include any number of items, including, but not limited to, an identified content item, characteristics of the content item, a web page the content item was provided on, a content landing page, characteristics of the content landing page, and data from browsing histories of users that viewed the content item (i.e. domains, web pages, keywords associated with the web pages and domains, characteristics of the domains and web pages, a time period representing when items in the browsing history was viewed in relation to the content item, intersections and/or signals or combinations of signals with the highest predictive ability of content viewed between different users, etc.). Each item in the log of content items can be associated with a number based on the location of each content item in a table correlating content items to numbers in a database within the re-identification server.

At an operation 304, the re-identification server can identify a first content item from the log of content items. The first content item can be content provided by a content provider that the re-identification server is using to determine if a content provider is tracking users after the users chose an option not to be tracked or if content is user targeted content. At an operation 306, the re-identification server can generate a set of identifications of a group of content items from the log of content items. The identifications can be generated by user devices based on a stored content associated with the web activity of different users. The stored record of content can be a browsing history associated with the browser associated with a user. The identifications can be retrieved from any number of user devices. In some implementations, the identifications can be associated with content viewed within a time period of viewing the first content item.

At an operation 308 the re-identification server can identify intersections and/or signals or combinations of signals with the highest predictive ability between the browsing histories of different users of the log of content. Intersections and/or signals or combinations of signals with the highest predictive ability are common web sites, domains, and keywords associated with the web pages and domains between multiple users, in some implementations. The re-identification server can identify common content items as unique inputs into a neural network of the re-identification server. The neural network can use these inputs and determine a probability that a content provider that provided the first content item was tracking users that viewed the first content item before providing the content or if content is user targeted content. If the probability is not above a predetermined threshold, the re-identification server can determine it to be unlikely that content was provided as a result of unauthorized identification and continue transmitting content from the provider to computing devices at operation 310.

If the re-identification server determines the probability to be above the threshold, however, at operation 312, the re-identification server can identify a content provider that provided the first content item. The re-identification server can do so using information from the browsers that received the first content item identifying where the first content item originated. In some implementations, the re-identification server can identify the content provider based on a web page that was most commonly visited before users were provided with the first content item. For example, if most users visited website A before being presented with the first content item, the re-identification server can determine it likely that tracking began or occurred at website A. This is advantageous if a content provider uses a false identifier when providing content to avoid any identification by the browser that the content items are displayed on.

At operation 314, the re-identification server can increment a counter associated with the content provider identified at operation 312. The re-identification server can store and increment counters for any number of content providers and increment the counters respective to the content providers at each instance that the content providers are determined to be tracking users against their wishes (i.e. after the user explicitly or passively disables third party cookies or takes other security measures) or if content is user targeted content. At operation 316, the re-identification server can determine if, after the counter associated with the identified content provider is incremented, the counter exceeds a predetermined threshold. The predetermined threshold can be determined by an administrator and can be any number. If the counter is determined to not be above the threshold, then any content provided by the content provider can be transmitted to user devices at operation 310.

If the counter is determined to be above the predetermined threshold, however, at operation 318, the re-identification server can receive a request from a user device for content from the identified content provider and, at operation 320, redirect the request to a second content provider that has not been established to be tracking users against their wishes or if content is user targeted content. The re-identification server can update the neural network of the re-identification server based on each determination related to the content provider. Further, re-identification server can repeat the operations above repeatedly for any number of content items provided to different users.

Figure 4:
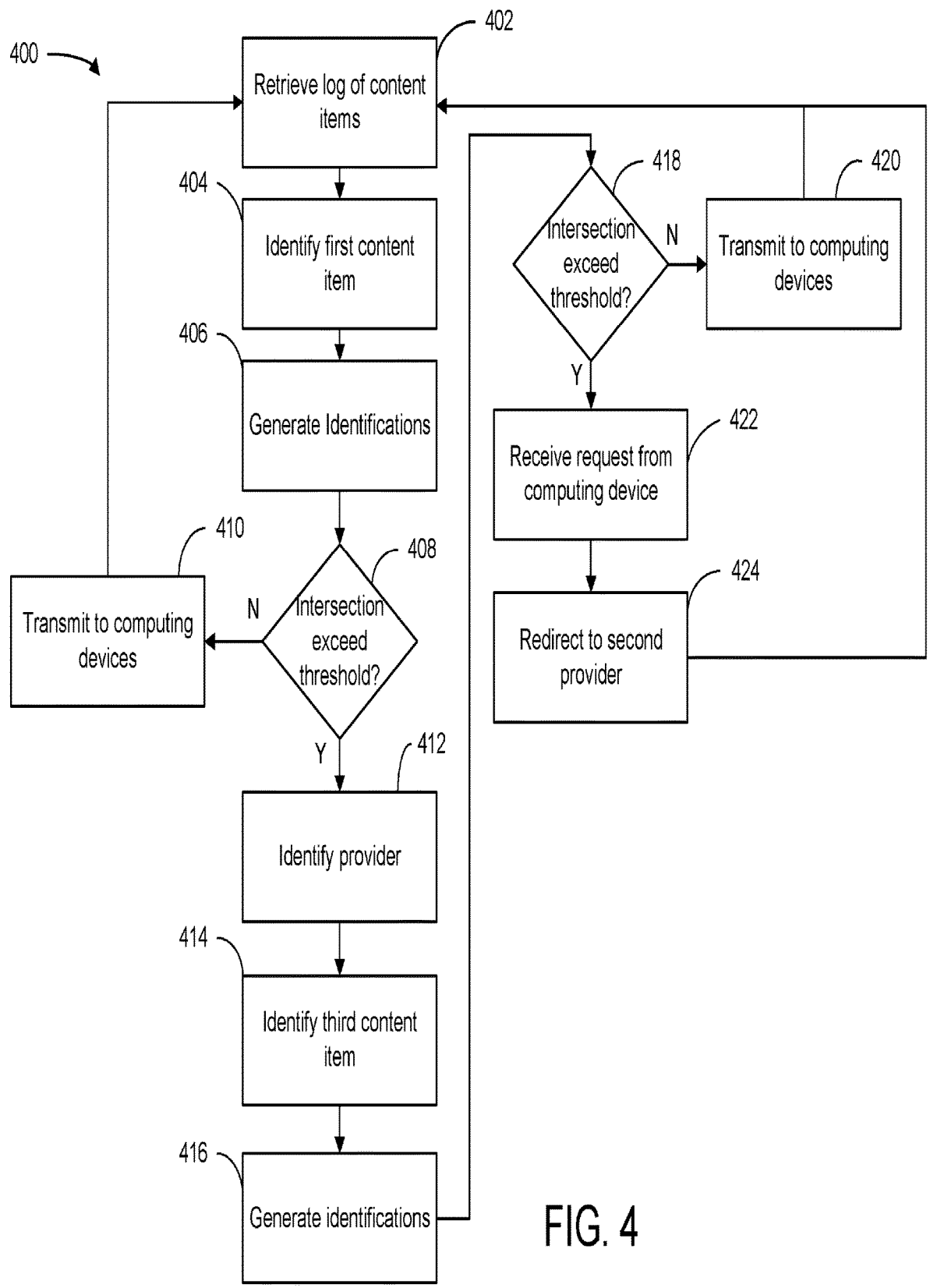
FIG. 4 is a flow chart illustrating another method for determining if a third party is tracking activity of users based on outputs from the neural network, according to some implementations.

Referring now to FIG. 4, a flow chart illustrating another method 400 for determining if a third party is tracking activity of users based on outputs from the neural network or if content is user targeted content is shown, according to some embodiments. Method 400 can be performed by re-identification server or any server. Operations 402, 404, 406, 408, 410, and 412 can be the same as or similar to corresponding operations 302, 304, 306, 308, 310, and 312, shown and described in reference to FIG. 3. After identifying a content provider that is likely tracking users against the wishes of the users or if content is user targeted content, at operation 414, the re-identification server can identify a third content item provided by the identified content provider. The re-identification server can identify the third content item from a log of content provided by multiple user devices based on browsing histories of the user devices. In some implementations, the re-identification server can identify the third content item from a log of content retrieved at operation 402. In some implementations, the re-identification server can identify the third content item after retrieving another log of content from multiple user devices.

At operation 416, the re-identification server can generate identifications from the log of content that is associated with the third content item. The re-identification server can identify content and characteristics of the content similar to how it did so in operation 406. The re-identification server can identify intersections and/or signals or combinations of signals with the highest predictive ability that represent common content viewed by multiple users before viewing the third content item and input the intersections and/or signals or combinations of signals with the highest predictive ability into a neural network of the re-identification server. At operation 418, through the neural network, the re-identification server can determine if the output of the neural network based on the intersection and/or the signal or combination of signals with the highest predictive ability inputs exceeds a threshold. If the output does not exceed a threshold, at operation 420, the re-identification server can continue to transmit requests for content to the content provider from user devices.

If the probability exceeds a threshold, however, at operation 422, the re-identification server can receive a request from a user device for content from the identified content provider. At operation 424, the re-identification server can redirect the request to a second content provider that has not been established to be tracking users against their wishes or has not provided targeted content. The re-identification server can update the neural network of the re-identification server based on each determination related to the content provider. Further, re-identification server can repeat the operations above repeatedly for any number of content items provided to different users.

Advantageously, by implementing the systems and methods described herein, a system can determine if third party content providers are tracking web activity of users that do not wish to be tracked or if content is user targeted content. Previous methods have not been successful in determining if third party content providers are tracking users or if content is user targeted content because the same content can appear to users regardless of if the users are being tracked or not. However, by providing inputs into a neural network that analyzes the browser history of different users before the users were provided with the content, the systems and methods described herein can automatically identify whether content is user targeted content or when content providers are tracking users and prevent them from doing so. Consequently, users can feel safe in their privacy as they search the web pages on the Internet.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed:

1. A method for detecting third-party re-identification of anonymized computing devices, comprising:
    receiving, by a client device, a plurality of first content items within a predetermined time period;
    subsequently transmitting, by the client device, a first request for a content item from a content provider;
    receiving, by the client device, a second content item from the content provider in response to the first request; and
    transmitting, by the client device, a second request for a content item from the content provider, the second request blocked by an intermediary server responsive to the intermediary server determining that a signal or a combination of signals with a highest predictive ability between a first set of identifications of third content items retrieved by a first anonymized computing device and a second set of identifications of fourth content items retrieved by a second anonymized computing device exceeds a threshold, the third content items and the fourth content items retrieved prior to the respective first or second anonymized computing devices receiving the second content item.

2. The method of claim 1, wherein the identifications of the fourth content items comprise identifications of web pages visited by the second anonymized computing device.

3. The method of claim 1, wherein the identifications of the fourth content items comprise identifications of domains visited by the second anonymized computing device.

4. The method of claim 1, wherein the identifications of the fourth content items comprise identifications of keywords associated with domains visited by the second anonymized computing device.

5. The method of claim 1, wherein the intermediary server is configured to determine that a size of the signal or combination of signals with the highest predictive ability between the first set of identifications and the second set of identifications exceeds a size of signals or combination of signals with the highest predictive ability between another pair of sets of identifications.

6. The method of claim 1, wherein the intermediary server determines that the signal or combination of signals with the highest predictive ability between the first set of identifications and the second set of identifications is common to a third set of identifications.

7. The method of claim 1, wherein the intermediary server is configured to block the second request by redirecting the second request to a second content provider.

8. The method of claim 1 wherein the intermediary server is configured to block the second request by:
    identifying a fifth content item provided by the content provider to third and fourth anonymized computing devices;
    for the third and fourth anonymized computing devices, generating a set of identifications of sixth content items retrieved by the third and fourth anonymized computing devices prior to receiving the fifth content item; and
    determining that the signal or combination of signals with the highest predictive ability between a first set of identifications of sixth content items and a second set of identifications of sixth content items exceeds the threshold.

9. The method of claim 1, wherein the intermediary server is configured to increment a counter associated with the content provider, responsive to the determination that the signal or combination of signals with the highest predictive ability between the first set of identifications and the second set of identifications exceeds the threshold.

10. The method of claim 9, wherein the intermediary server is configured to block transmission of the second request further responsive to the counter associated with the content provider exceeding a second threshold.

11. A system for detecting third-party re-identification of anonymized computing devices, comprising:
    a client device comprising a processor, a memory device, and a network interface, wherein the processor is configured to:
    receive, via the network interface, a plurality of first content items within a predetermined time period;
    subsequently transmit, via the network interface, a first request for a content item from a content provider;
    receive, via the network interface, a second content item from the content provider in response to the first request; and
    transmit, via the network interface, a second request for a content item from the content provider, the second request blocked by an intermediary server responsive to the intermediary server determining that a signal or a combination of signals with a highest predictive ability between a first set of identifications of third content items retrieved by a first anonymized computing device and a second set of identifications of fourth content items retrieved by a second anonymized computing device exceeds a threshold, the third content items and the fourth content items retrieved prior to the respective first or second anonymized computing devices receiving the second content item.

12. The system of claim 11, wherein the identifications of the fourth content items comprise identifications of web pages visited by the second anonymized computing device.

13. The system of claim 11, wherein the identifications of the fourth content items comprise identifications of domains visited by the second anonymized computing device.

14. The system of claim 11, wherein the identifications of the fourth content items comprise identifications of keywords associated with domains visited by the second anonymized computing device.

15. The system of claim 11, wherein the intermediary server is configured to determine that a size of the signal or combination of signals with the highest predictive ability between the first set of identifications and the second set of identifications exceeds a size of signals or combination of signals with the highest predictive ability between another pair of sets of identifications.

16. The system of claim 11, wherein the intermediary server determines that the signal or combination of signals with the highest predictive ability between the first set of identifications and the second set of identifications is common to a third set of identifications.

17. The system of claim 11, wherein the intermediary server is configured to block the second request by redirecting the second request to a second content provider.

18. The system of claim 11 wherein the intermediary server is configured to block the second request by:

identifying a fifth content item provided by the content provider to third and fourth anonymized computing devices;

for the third and fourth anonymized computing devices, generating a set of identifications of sixth content items retrieved by the third and fourth anonymized computing devices prior to receiving the fifth content item; and determining that the signal or combination of signals with the highest predictive ability between a first set of identifications of sixth content items and a second set of identifications of sixth content items exceeds the threshold.

19. The system of claim 11, wherein the intermediary server is configured to increment a counter associated with the content provider, responsive to the determination that the signal or combination of signals with the highest predictive ability between the first set of identifications and the second set of identifications exceeds the threshold.

20. The system of claim 19, wherein the intermediary server is configured to block transmission of the second request further responsive to the counter associated with the content provider exceeding a second threshold.

* * * * *